United States Patent
Zhou et al.

(10) Patent No.: US 10,303,522 B2
(45) Date of Patent: May 28, 2019

(54) SYSTEM AND METHOD FOR DISTRIBUTED GRAPHICS PROCESSING UNIT (GPU) COMPUTATION

(71) Applicant: TuSimple, San Diego, CA (US)

(72) Inventors: Kai Zhou, San Diego, CA (US); Siyuan Liu, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 41 days.

(21) Appl. No.: 15/640,510

(22) Filed: Jul. 1, 2017

(65) Prior Publication Data

US 2019/0004868 A1  Jan. 3, 2019

(51) Int. Cl.
*G06T 1/20* (2006.01)
*G06F 9/50* (2006.01)
*G06F 16/955* (2019.01)

(52) U.S. Cl.
CPC .......... *G06F 9/5083* (2013.01); *G06F 9/5055* (2013.01); *G06F 16/9566* (2019.01); *G06T 1/20* (2013.01)

(58) Field of Classification Search
CPC .......................... G06F 2009/4557; G06T 1/20
See application file for complete search history.

(56) References Cited

U.S. PATENT DOCUMENTS

| | | |
|---|---|---|
| 6,777,904 B1 | 8/2004 | Degner |
| 7,103,460 B1 | 9/2006 | Breed |
| 7,689,559 B2 | 3/2010 | Canright |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |

(Continued)

FOREIGN PATENT DOCUMENTS

| | | |
|---|---|---|
| EP | 1754179 A1 | 2/2007 |
| EP | 2448251 A2 | 5/2012 |

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

(Continued)

*Primary Examiner* — Ryan McCulley
(74) *Attorney, Agent, or Firm* — Inventive Law Inc.; Jim H. Salter (57) ABSTRACT

A system and method for distributed graphics processing unit (GPU) computation are disclosed. A particular embodiment includes: receiving a user task service request from a user node; querying resource availability from a plurality of slave nodes having a plurality of graphics processing units (GPUs) thereon; assigning the user task service request to a plurality of available GPUs based on the resource availability and resource requirements of the user task service request, the assigning including starting a service on a GPU using a distributed processing container and creating a corresponding uniform resource locator (URL); and retaining a list of URLs corresponding to the resources assigned to the user task service request.

14 Claims, 5 Drawing Sheets

(56) References Cited

U.S. PATENT DOCUMENTS

| | | |
|---|---|---|
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,575,789 B1 * | 2/2017 | Rangari ............ G06F 9/45533 |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 9,880,933 B1 * | 1/2018 | Gupta ............... G06F 12/0815 |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0035736 A1 * | 2/2011 | Stefansson ............ G06F 9/5072 717/149 |
| 2011/0161495 A1 * | 6/2011 | Ratering ............... G06F 9/5044 709/226 |
| 2011/0206282 A1 | 8/2011 | Aisaka |
| 2012/0105639 A1 | 5/2012 | Stein |
| 2012/0140076 A1 | 6/2012 | Rosenbaum |
| 2012/0246336 A1 * | 9/2012 | Sathish ................ G06F 9/5055 709/238 |
| 2012/0274629 A1 | 11/2012 | Baek |
| 2013/0093776 A1 * | 4/2013 | Chakraborty ........... G06F 9/452 345/520 |
| 2014/0145516 A1 | 5/2014 | Hirosawa |
| 2014/0198184 A1 | 7/2014 | Stein |
| 2015/0062304 A1 | 3/2015 | Stein |
| 2015/0120928 A1 * | 4/2015 | Gummaraju ........ H04L 67/1008 709/226 |
| 2015/0128136 A1 * | 5/2015 | Rafique ................ G06F 9/5077 718/1 |
| 2015/0212859 A1 * | 7/2015 | Rafique ............... G06F 9/45533 345/503 |
| 2015/0353082 A1 | 12/2015 | Lee |
| 2015/0381756 A1 * | 12/2015 | Lotfallah ............ H04L 67/2814 726/4 |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0266938 A1 * | 9/2016 | Suzuki ................. G06F 9/5083 |
| 2016/0321381 A1 | 11/2016 | English |
| 2016/0323374 A1 * | 11/2016 | Russinovich ....... H04L 67/1025 |
| 2016/0375907 A1 | 12/2016 | Erban |
| 2017/0214737 A1 * | 7/2017 | Agarwal ............. G06F 9/45558 |
| 2017/0220432 A1 * | 8/2017 | Misra ................. G06F 11/2092 |
| 2017/0256018 A1 * | 9/2017 | Gandhi ..................... G06T 1/60 |
| 2017/0308401 A1 * | 10/2017 | Argenti ................ G06F 9/5027 |
| 2017/0373940 A1 * | 12/2017 | Shahab .................. H04L 41/12 |
| 2018/0060996 A1 * | 3/2018 | Tunuguntla ............... G06T 1/20 |
| 2018/0173526 A1 * | 6/2018 | Prinsloo ................. G06F 8/77 |
| 2018/0232255 A1 * | 8/2018 | Nordin ................. G06F 9/4881 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

(56) References Cited

OTHER PUBLICATIONS

Hou, Xiaodi and Zhang, Liqing, "Dynamic Visual Attention: Searching for Coding Length Increments", Advances in Neural Information Processing Systems, vol. 21, pp. 681-688, 2008.
Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.
Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.
Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.
Hou, Xiaodi and Zhang, Liqing, "Color Conceptualization", Proceedings of the 15th ACM International Conference on Multimedia, pp. 265-268, ACM, 2007.
Hou, Xiaodi and Zhang, Liqing, "Thumbnail Generation Based on Global Saliency", Advances in Cognitive Neurodynamics, ICCN 2007, pp. 999-1003, Springer Netherlands, 2008.
Hou, Xiaodi and Yuille, Alan and Koch, Christof, "A Meta-Theory of Boundary Detection Benchmarks", arXiv preprint arXiv:1302.5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701.01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Vlykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dull, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.

* cited by examiner

SYSTEM AND METHOD FOR DISTRIBUTED GRAPHICS PROCESSING UNIT (GPU) COMPUTATION

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for distributed processing, graphics processing, image processing systems, and autonomous driving systems, and more particularly, but not by way of limitation, to a system and method for distributed graphics processing unit (GPU) computation.

BACKGROUND

Existing methods for handling user task requests typically involve assigning a task request to a single computing system or assigning multiple task requests to a single computing system with a multitasking operating system. Conventional systems also provide for assigning multiple tasks to the central processing units (CPUs) of distributed computing systems with multitasking capabilities. However, such conventional distributed systems have been unable to handle the significant processing loads imposed by the image processing requirements of modern technologies, particularly autonomous driving systems. These processing loads often involve the use of a graphics processing unit (GPU), which has not been available as a distributed resource.

SUMMARY

A system and method for distributed graphics processing unit (GPU) computation are disclosed herein. The system and method of an example embodiment relate to graphic data processing using distributed GPUs based on container-enabled systems, or CPUs based on container-enabled systems. As described in more detail below, a conventional container-enabled system, such as Docker™, can be used to implement a plurality of distributed containers for processing data. Specifically, the system of an example embodiment includes a master node, a load balancing node, and multiple slave nodes configured with multiple GPUs being mounted on distributed containers. In the method of an example embodiment, the whole process may be divided into two stages: 1) an internal stage where a master node starts multiple distributed processing containers and generates a list of Uniform Resource Locators (URLs) thereafter; and 2) an external stage where a load balancing server generates an overall unique URL based on the list of URLs and sends the overall unique URL to a user node for the purpose of proceeding with the processing of user tasks as requested by users.

The master node may dynamically maintain a list of available computing resources and their status. In particular, the master node can determine the number of GPUs mounted within an individual computer and the number of resources available therein, based on which distributed containers are started and the list of URLs defining a path to access each distributed container started, respectively. Specifically, to perform a task requested by a user, the master node may select distributed containers available to perform the task based on information regarding the type of distributed container requested by the task, the total number of distributed containers needed, and whether the task is a GPU intensive job or otherwise a CPU intensive one. In the case of GPU intensive jobs, distributed containers may be selected in sequence beginning from the first computer having sufficient resources to provide at least one distributed container under the principle that each computer is utilized to the maximum. This means that each computer provides as many distributed containers as possible according to the resources left within each computer. In the case of CPU intensive jobs, a same number of distributed containers may be started within distributed computers having sufficient resources left. In an example embodiment the distributed containers started can be equally distributed among the available computers. Once all distributed containers needed are selected, a list of Uniform Resource Locators (URLs), through which the distributed containers selected can be accessed, may be generated and further sent to the load balancing server, which is configured for completing a load balancing operation.

In the second stage, the load balancing server may generate an overall unique URL representing the whole list of URLs and send the overall unique URL to users who are then able to input task requests and information associated through the URL to the system at issue. Then, the system can start to process data and thereafter complete user tasks requested. The whole system may be stopped by users who have full discretion. Upon receiving a stop request, the master node may stop the system in operation and delete distributed containers selected in the first place, while information related to a task at issue may be removed from the load balancing server as well.

The embodiments disclosed herein overcome the problems and limitations of traditional systems by offering large scale distributed processing resources, including central processing and graphics data processing, to handle the intense processing loads.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for distributed graphics processing unit (GPU) computation are disclosed herein. The system and method of an example embodiment relate to graphic data processing using distributed GPUs based on container-enabled systems, or CPUs based on container-enabled systems. As described in more detail below, a conventional container-enabled system, such as Docker™, can be used to implement a plurality of distributed containers for processing data. Specifically, the system of an example embodiment includes a master node, a load balancing node, and multiple slave nodes configured with multiple GPUs being mounted on distributed containers. In the method of an example embodiment, the whole process may be divided into two stages: 1) an internal stage where a master node starts multiple distributed processing containers and generates a list of URLs thereafter; and 2) an external stage where a load balancing server generates an overall unique URL based on the list of URLs and sends the overall unique URL to a user node for the purpose of proceeding with the processing of user tasks as requested by users.

The master node may dynamically maintain a list of available computing resources and their status. In particular, the master node can determine the number of GPUs mounted within an individual computer and the number of resources available therein, based on which distributed containers are started and the list of URLs defining a path to access each distributed container started, respectively. Specifically, to perform a task requested by a user, the master node may select distributed containers available to perform the task based on information regarding the type of distributed container requested by the task, the total number of distributed containers needed, and whether the task is a GPU intensive job or otherwise a CPU intensive one. In the case of GPU intensive jobs, distributed containers may be selected in sequence beginning from the first computer having sufficient resources to provide at least one distributed container under the principle that each computer is utilized to the maximum. This means that each computer provides as many distributed containers as possible according to the resources left within each computer. In the case of CPU intensive jobs, a same number of distributed containers may be started within distributed computers having sufficient resources left. In an example embodiment the distributed containers started can be equally distributed among the available computers. Once all distributed containers needed are selected, a list of Uniform Resource Locators (URLs), through which the distributed containers selected can be accessed, may be generated and further sent to the load balancing server, which is configured for completing a load balancing operation.

In the second stage, the load balancing server may generate an overall unique URL representing the whole list of URLs and send the overall unique URL to users who are then able to input task requests and information associated through the URL to the system at issue. Then, the system can start to process data and thereafter complete tasks requested. The whole system may be stopped by users who have full discretion. Upon receiving stop request, the master node may stop the system in operation and delete distributed containers selected in the first place, while information related to a task at issue may be removed from the load balancing server as well.

As mentioned above, a conventional container-enabled system, such as Docker™, can be used to implement a plurality of distributed containers for processing data. Docker™ is a conventional software system providing a technology concept called "containers", promoted by the company, Docker™, Inc. Docker™ provides an additional layer of abstraction and automation of operating system level virtualization on Windows™ and Linux™ systems, among others. Docker™ uses the resource isolation features of the Linux kernel, such as cgroups and kernel namespaces, and a union-capable file system such as OverlayFS™ and others to allow independent data processing containers to run within a single Linux instance, avoiding the overhead of starting and maintaining virtual machines. The Linux kernel's support for namespaces mostly isolates an application's view of the operating environment, including process trees, network, user identifiers (IDs) and mounted file systems, while the kernel's cgroups provide resource limiting, including the CPU, memory, block I/O, and network. Docker™ includes the Libcontainer library as its own way to directly use virtualization facilities provided by the Linux kernel, in addition to using abstracted virtualization interfaces via Libvirt, LXC (Linux Containers), and systemd-nspawn. As actions are performed on a Docker™ base image, union file system layers are created and documented, such that each layer fully describes how to recreate an action. This strategy enables lightweight images in Docker™, as only layer updates need to be propagated, compared to full virtual machines (VMs), for example. As such, Docker™, or any container-enabling system, provides a tool that can package an application and its dependencies in a virtual container that can run on any Linux™ server. Docker™ implements a high-level API to provide lightweight containers that run processes in isolation. Because Docker containers are so lightweight, a single server or virtual machine can run several containers simultaneously. Using Docker™ or other container-enabling system to create and manage containers may simplify the creation of highly distributed systems by allowing multiple applications, worker tasks, and other processes to run autonomously on a single physical machine or across multiple virtual machines. This allows the deployment of nodes to be performed as the resources become available or when more nodes are needed.

As also mentioned above, a load balancing server can be used in an example embodiment. In the example embodiment, an Nginx™ (pronounced as Engine-X) server can be used as a load balancing server. Nginx™ is a conventional open source, lightweight, high-performance web server or proxy server. Nginx™ servers can be used as reverse proxy servers for HTTP, HTTPS, SMTP, IMAP, or POP3 protocols. Nginx™ servers can also be used for load balancing and HTTP caching.

Figure 1:
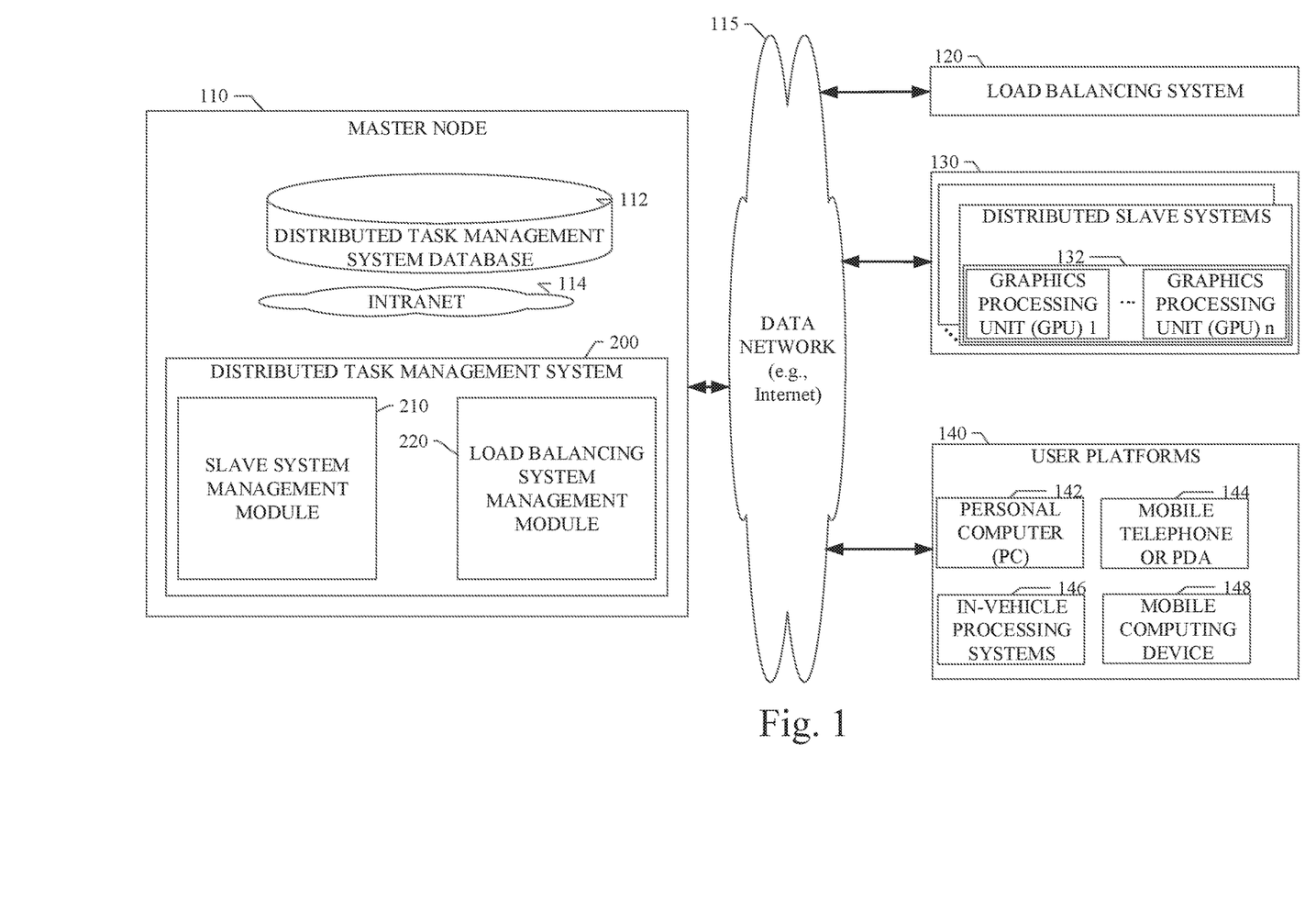
FIG. 1 illustrates an example embodiment of a networked system in which various embodiments may operate.

As described for various example embodiments herein, a system and method for distributed graphics processing unit (GPU) computation are described. Referring to FIG. 1, an example embodiment disclosed herein can be implemented as an application or service, typically provided by or operating on a server or host site, denoted herein as the master node 110. The master node 110 is provided to simplify and facilitate the hosted use of the distributed task management system 200 of an example embodiment. In a particular embodiment, the distributed task management system 200 can be hosted by the master node 110 and used with a plurality of distributed computing devices via a data network 115, such as the Internet. The distributed computing devices can include a load balancing system 120, a plurality of distributed slave systems 130, and/or a plurality of distributed user platforms 140. The distributed computing devices can also include directly connected (e.g., non-networked) computing devices. The details of the distributed task management system 200 of an example embodiment are provided below.

Referring again to FIG. 1, the distributed task management system 200 can be in network data communication with the load balancing system 120, the plurality of distributed slave systems 130, and the plurality of distributed user platforms 140. The load balancing system 120 can include computing systems, data processors, or other network resources at which data processing for system load balancing can be performed. In a particular embodiment, an Nginx™ server can be used for load balancing. The distributed slave systems 130 can also include computing systems, data processors, or other network resources at which data processing for particular user tasks can be performed. The distributed slave systems 130 can provide support for handling user tasks that are either CPU-intensive tasks or GPU-intensive tasks. As described in more detail below, the master node 110 can assign the user tasks received from the distributed user platforms 140 to processing containers running on one or more of the distributed slave systems 130. One or more GPUs 132 in each of the distributed slave systems 130 are mounted on the processing containers, which can perform the user tasks. The plurality of distributed user platforms 140 represent the variety of different types of processing platforms from which users can submit tasks for processing through the master node 110.

In various embodiments, the distributed user platforms 140 with one or more users and one or more distributed computing devices executing therein can submit user task requests to the distributed task management system 200 via the master node 110, which can assign the user task requests to one or more distributed computing devices of the distributed slave systems 130 via network 115. The distributed computing devices of the load balancing system 120, the distributed slave systems 130, and distributed user platforms 140 may include virtually any computing device that is configured to process data and send and receive information over a network, such as network 115. Such distributed computing devices of user platforms 140 may include portable devices 144, such as, cellular telephones, smart phones, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The distributed computing devices of user platforms 140 may also include other computing devices, such as personal computers 142, multiprocessor systems, mainframe computers, in-vehicle processing systems 146, microprocessor-based or programmable computing systems, network PC's, and the like. The distributed computing devices of user platforms 140 may also include other processing devices, such as mobile computing devices 148, which are known to those of ordinary skill in the art. As such, the distributed computing devices of distributed user platforms 140 may range widely in terms of capabilities and features. Moreover, the distributed computing devices of user platforms 140 may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The distributed computing devices of distributed user platforms 140 may also include at least one application that is configured to generate user data processing tasks, task requests, or other processing requests and to submit such user task requests via a wired or wireless network transmission to the master node 110. The application may include a capability to provide and receive textual data, graphical data, video data, audio data, and the like. Moreover, distributed computing devices of distributed user platforms 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

One or more of the load balancing system 120, the distributed slave systems 130, and the distributed user platforms 140 can be provided by one or more third party providers operating at various locations in a network ecosystem. It will be apparent to those of ordinary skill in the art that load balancing system 120 or distributed slave systems 130 can be any of a variety of networked third party data processing systems. In a particular embodiment, a resource list maintained at the master node 110 can be used as a registry or list of all distributed slave systems 130, which the master node 110 may use to process the user task requests. The master node 110, load balancing system 120, distributed slave systems 130, and distributed user platforms 140 may communicate and transfer data and information in the data network ecosystem shown in FIG. 1 via a wide area data network (e.g., the Internet) 115. Various components of the master node 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of distributed computing devices 140, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The load balancing system 120, distributed slave systems 130, and/or the distributed user platforms 140 may communicate on network 115 via any of a variety of types of network transportable digital data. The network transportable digital data can be transported in any of a family of file formats and associated mechanisms usable to enable a master node 110 and a distributed user platform 140 to transfer user task data over the network 115. Any electronic file format and any data interchange format defined by specific sites can be supported by the various embodiments described herein.

Referring again to FIG. 1, the distributed task management system 200 of an example embodiment is shown to include distributed task management system database 112. The database 112 can be used to retain a variety of information data sets including, but not limited to, user task request data, task type (e.g., CPU-intensive or GPU-intensive), task identifier, URLs, and the like. It will be apparent to those of ordinary skill in the art that the distributed task management system database 112 can be locally resident at the master node 110 or remotely located at other server locations or stored in network cloud storage. The distributed task management system database 112 can be implemented with standard data storage devices (e.g., flash memory, DRAM, SIM cards, or the like) or as cloud storage in a networked server.

Figure 2:
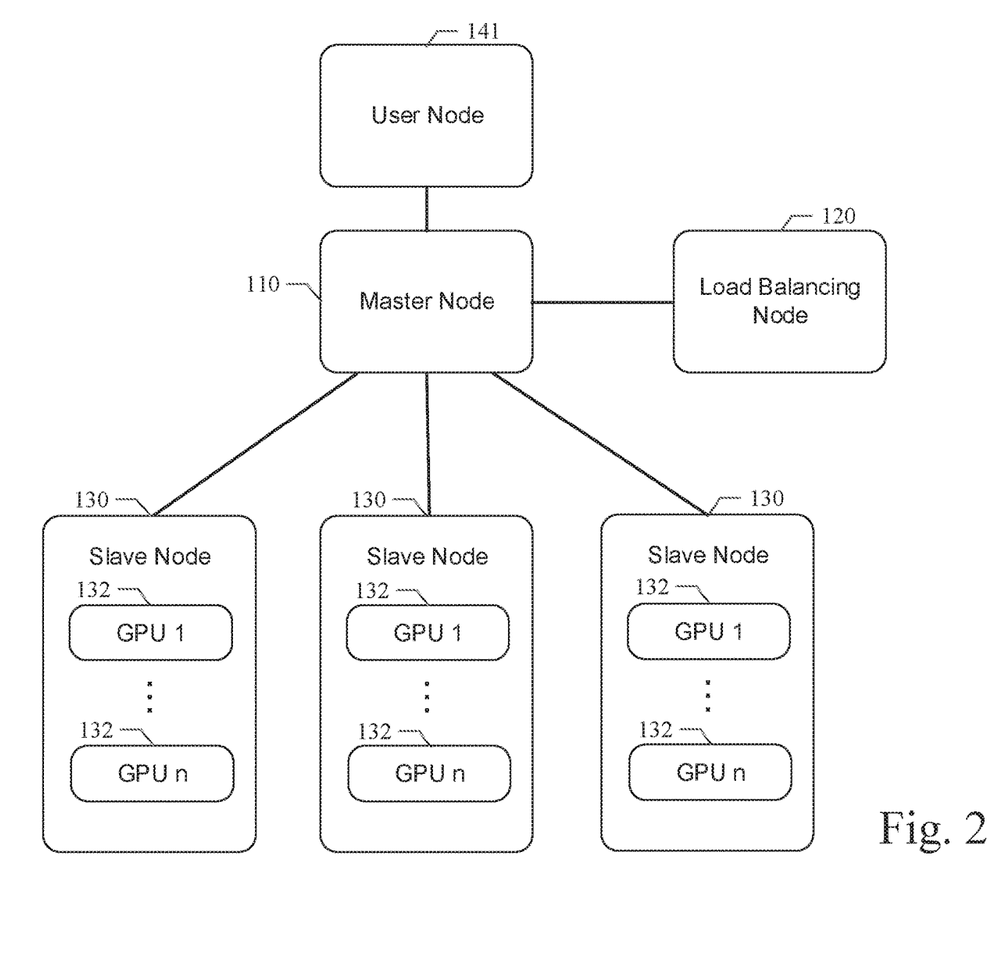
FIG. 2 illustrates an example embodiment with the master node in data communication with a user node of the distributed user platforms, the load balancing node, and a plurality of slave nodes, each having one or more graphics processing units (GPUs)

Referring now to FIG. 2, the master node 110 of an example embodiment is shown in data communication with a user node 141 of distributed user platforms 140, the load balancing node 120, and a plurality of slave nodes 130. Each of the slave nodes 130 is shown to include one or more GPUs 132. In a particular embodiment, the slave nodes 130 can include between one and four GPUs 132. The GPUs 132 of each slave node 130 can be mounted on one or more distributed containers for handling one or more user task requests. In a particular embodiment, the distributed container can be a Docker™ or a pre-configured virtual machine. As described in more detail below, the distributed task management system 200 of master node 110 can manage the assignment of user task requests to particular GPUs and distributed containers of one or more slave nodes 130. The distributed task management system 200 of master node 110 can also manage the load balancing of the processing for a plurality of user task requests by use of the load balancing node 120. The interaction of the user node 141, the master node 110, the slave nodes 130, and the load balancing node 120 is described in more detail below.

Referring again to FIG. 1, master node 110 of an example embodiment is shown to include the distributed task management system 200. In an example embodiment, distributed task management system 200 can include a slave system management module 210 and a load balancing system management module 220. Each of these modules can be implemented as software components executing within an executable environment of distributed task management system 200 operating on master node 110. Each of these modules of an example embodiment is described in more detail below in connection with the figures provided herein.

Referring still to FIG. 1, the distributed task management system 200 can include a slave system management module 210. The slave system management module 210 can be configured to perform the processing as described herein. In general, the slave system management module 210 can be configured to handle a user task request to start a user task service, stop service, or query a user task service status. The slave system management module 210 can also be configured to query the resource usage on each of the available slave nodes 130 and the GPUs 132 thereon. The slave system management module 210 can also be configured to assign user tasks to and start corresponding services on particular slave nodes 130 and the GPUs 132 and processing container thereon. The slave system management module 210 can also be configured to retain a list of the URLs corresponding to the user task requests and the particular assigned slave nodes 130 and GPUs 132. Additional details of the processing performed by the slave system management module 210 are provided below in connection with FIG. 3.

Referring still to FIG. 1, the distributed task management system 200 can include a load balancing system management module 220. The load balancing system management module 220 can be configured to perform the processing as described herein. In general, the load balancing system management module 220 can be configured to handle the load balancing of the processing performed for the various user task requests submitted by users of the user nodes. At the request of the master node 110, the load balancing system management module 220 can balance the processing performed by the GPUs 132 of the plurality of slave nodes 130. The load balancing system management module 220 can also be configured to return to the master node 110 an overall unique URL corresponding to the balanced processing performed for the particular user task request. Additional details of the processing performed by the slave system management module 210 are provided below in connection with FIG. 3.

Figure 3:
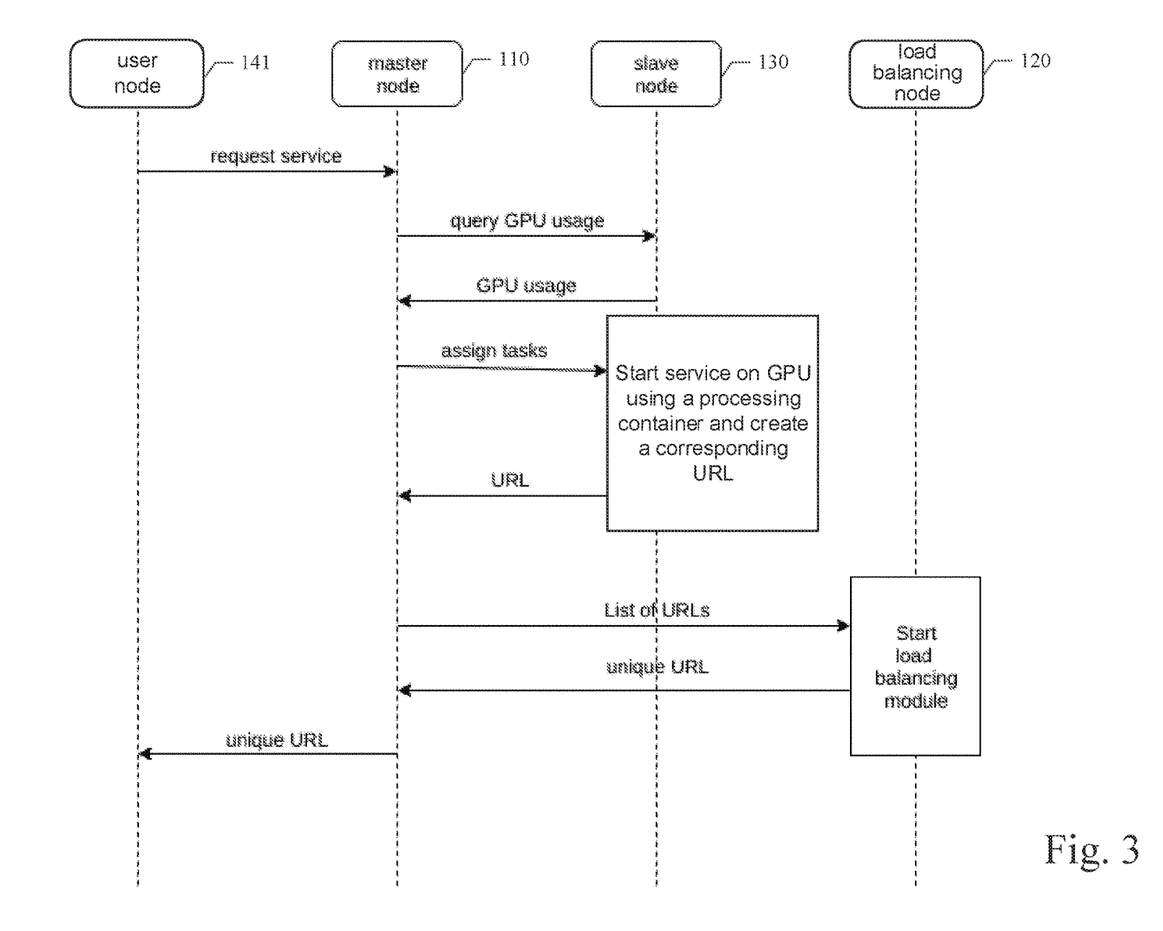
FIG. 3 is a sequence diagram illustrating an example embodiment of a system and method for distributed graphics processing unit (GPU) computation.

FIG. 3 is a sequence diagram illustrating an example embodiment of a system and method for distributed graphics processing unit (GPU) computation. The diagram illustrates a sequence of operations in the processing of a user task request in an example embodiment. The sequence of operations shown in FIG. 3 is time sequenced with the first or initial operation occurring at the top of the drawing and the last operation occurring at the bottom of the drawing. In an initial operation, a user at a user node 141 issues a user task service request to the master node 110 via a data communication as described above. In response to the user task service request, the master node 110 can query one or more slave nodes 130 to determine the resource usage or availability on the slave nodes 130. In particular, the master node 110 can query the usage or availability of the GPU(s) on each of the slave nodes 130. In response to the query from the master node 110, each of the slave nodes 130 can return information indicative of the resource usage or availability on the slave nodes 130. As a result, the master node 110 can determine the GPU availability on the plurality of slave nodes 130. Based on this information and the nature of the user task service request, the master node 110 can determine the number of slave node 130 resources needed and available to service the user task request. The nature of the user task service request can be determined from the user task service request itself. In an example embodiment, the user node 141 can encode into the user task service request information indicative of the distributed processing container name, a number of requested distributed containers, whether the task is a CPU intensive task or a GPU intensive task, a quantity of the GPU resources needed to service the request, and other information describing details of the user task service request. Given this information, the master node 110 can assign the user task service request to one or more available slave nodes 130 and one or more of the GPUs 132 thereon. The master node 110 can also start a service on the one or more GPUs 132 using a distributed processing container for the user task request. Once the master node 110 starts the service on the one or more GPUs 132 using the distributed processing container, the distributed processing container can return to the master node 110 a URL corresponding to the GPUs 132 and the user task service request. Upon receipt of the URL from the distributed processing container, the master node 110 can retain a list of all of the URLs corresponding to the user task requests and the particular assigned slave nodes 130 and GPUs 132.

Referring still to FIG. 3, the master node 110 can issue the list of URLs corresponding to the user task requests and the particular assigned slave nodes 130 and GPUs 132 to the load balancing node 120. The load balancing node 120 can balance the processing performed for the user task service request on the assigned slave nodes 130 and GPUs 132. The load balancing node 120 can also generate an overall unique URL that corresponds to the plurality of load balanced slave nodes 130 and GPUs 132. This unique URL can be sent from the load balancing node 120 to the master node 110. The overall unique URL can be forwarded from the master node 110 to the user node 141 that originated the user task service request. The user node 141 can use the overall unique URL to subsequently request a status of the user task service request from the master node 110. The user node 141 can also use the unique URL to subsequently request the master node 110 to terminate the processing of the user task service request. As a result of receiving a request from a user node 141 to terminate the processing of a user task service request, the master node 110 can request slave nodes 130 to delete any related distributed processing containers, deallocate any related GPUs, and remove any related processing from the load balancing node 120. Thus, a system and method for distributed graphics processing unit (GPU) computation are disclosed herein.

The various described embodiments provide several advantages over the conventional systems. Firstly, the example embodiments provide distributed GPU processing using distributed processing containers like Dockers™. Secondly, the example embodiments provide distributed GPU processing using one distributed processing container like Dockers™ with multiple PGUs on different computing machines. Thirdly, the example embodiments provide distributed GPU processing using distributed processing containers like Dockers™, wherein real-time slave node processing resources can be determined and distributed containers on the slave nodes can be dynamically assigned based on the determined resource availability. As a result, GPUs on the slave nodes can be maximally used. The various embodiments can service multiple users on multiple types of user devices with fast and efficient user task servicing. Each user obtains a proprietary URL, though which tasks are uploaded. In this way, users are separated from each other and tasks are processed independently. Fourthly, the master node, by dynamically maintaining a list of available slave nodes, GPUs, and their status, continuously monitors GPU status, and further dynamically assigns distributed containers to make full use of each available GPU.

Figure 4:
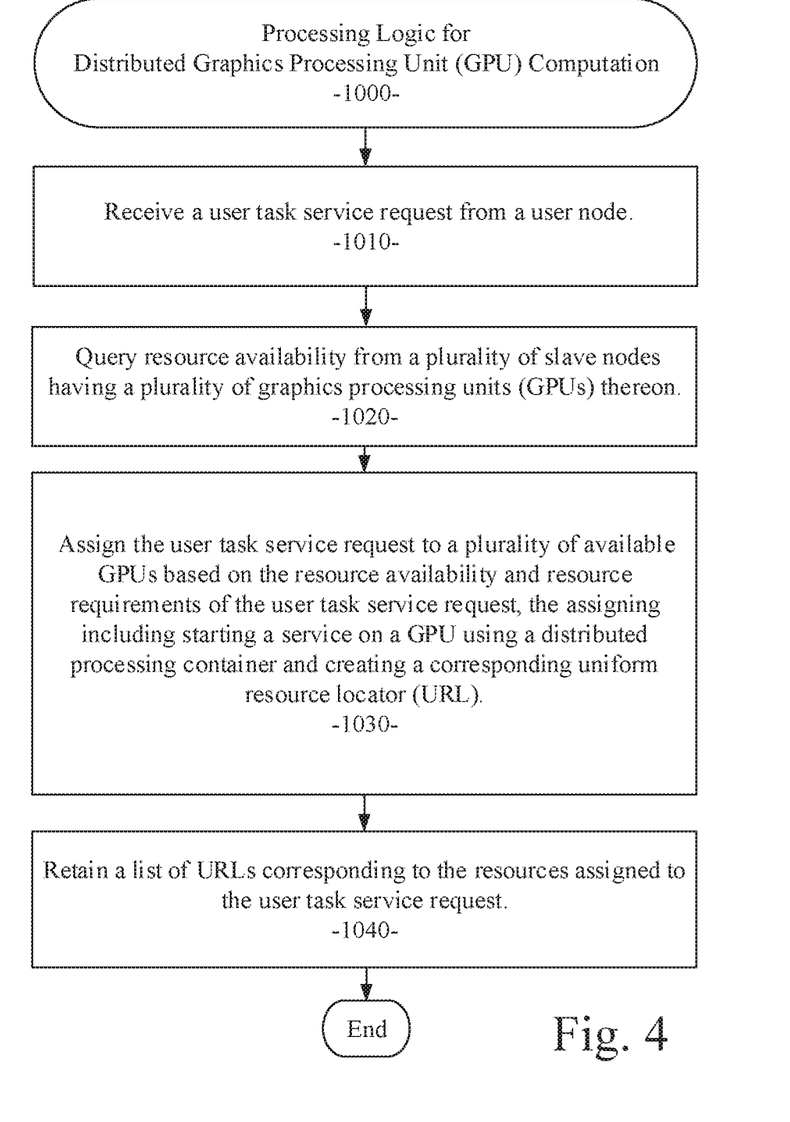
FIG. 4 is a process flow diagram illustrating an example embodiment of a system and method for distributed graphics processing unit (GPU) computation.

Referring now to FIG. 4, a flow diagram illustrates an example embodiment of a system and method 1000 for distributed GPU computation. The example embodiment can be configured for: receiving a user task service request from a user node (processing block 1010); querying resource availability from a plurality of slave nodes having a plurality of graphics processing units (GPUs) thereon (processing block 1020); assigning the user task service request to a plurality of available GPUs based on the resource availability and resource requirements of the user task service request, the assigning including starting a service on a GPU using a distributed processing container and creating a corresponding uniform resource locator (URL) (processing block 1030); and retaining a list of URLs corresponding to the resources assigned to the user task service request (processing block 1040).

Figure 5:
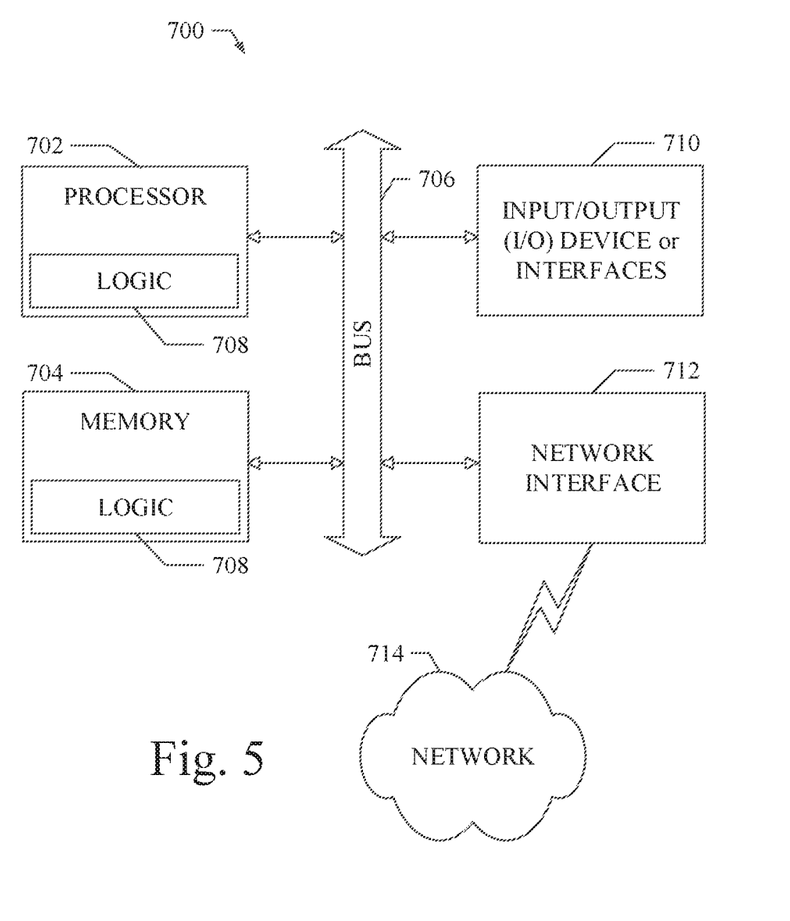
FIG. 5 shows a diagrammatic representation of machine in the example form of a computer system within which a set of instructions when executed may cause the machine to perform any one or more of the methodologies discussed herein.

FIG. 5 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
a distributed task management module, executable by the data processor, the distributed task management module being configured to:
receive a user task service request from a user node;
query resource availability from a plurality of slave nodes having a plurality of graphics processing units (GPUs) thereon, the plurality of slave nodes configured with multiple GPUs mounted on distributed processing containers;
generate a list of uniform resource locators (URLs), each URL on the list corresponding to a path to an available distributed processing container on the plurality of slave nodes;
issue the list of URLs to a load balancing node;
receive from the load balancing node an overall unique URL corresponding to the list of URLs;
use the overall unique URL to assign the user task service request to a plurality of available GPUs based on the resource availability and resource requirements of the user task service request, the assigning including using available distributed processing containers on the plurality of slave nodes; and
retain the list of URLs corresponding to the distributed processing containers assigned to the user task service request.

2. The system of claim 1 wherein the distributed processing containers are implemented using a container-enabled system having a plurality of distributed containers for processing data.

3. The system of claim 1 wherein the distributed task management module being configured to forward the overall unique URL to a user node that originated the user task service request.

4. The system of claim 1 wherein the distributed task management module being configured to determine a number of GPUs mounted within an individual slave node and a number of resources available therein.

5. The system of claim 1 wherein assigning the user task service request is based on whether the user task service request is a GPU intensive task or a central processing unit (CPU) intensive task.

6. A method comprising:
receiving a user task service request from a user node;
querying resource availability from a plurality of slave nodes having a plurality of graphics processing units (GPUs) thereon, the plurality of slave nodes configured with multiple GPUs mounted on distributed processing containers;

generating a list of uniform resource locators (URLs), each URL on the list corresponding to a path to an available distributed processing container on the plurality of slave nodes;

issuing the list of URLs to a load balancing node;

receiving from the load balancing node an overall unique URL corresponding to the list of URLs;

using the overall unique URL to assign the user task service request to a plurality of available GPUs based on the resource availability and resource requirements of the user task service request, the assigning including using available distributed processing containers on the plurality of slave nodes; and retaining the list of URLs corresponding to the distributed processing containers assigned to the user task service request.

7. The method of claim 6 wherein the distributed processing containers are implemented using a container-enabled system having a plurality of distributed containers for processing data.

8. The method of claim 6 including forwarding the overall unique URL to a user node that originated the user task service request.

9. The method of claim 6 including determining a number of GPUs mounted within an individual slave node and a number of resources available therein.

10. The method of claim 6 wherein assigning the user task service request is based on whether the user task service request is a GPU intensive task or a central processing unit (CPU) intensive task.

11. A non-transitory machine-useable storage medium embodying instructions which, when executed by a machine, cause the machine to:

receive a user task service request from a user node;

query resource availability from a plurality of slave nodes having a plurality of graphics processing units (GPUs) thereon, the plurality of slave nodes configured with multiple GPUs mounted on distributed processing containers;

generate a list of uniform resource locators (URLs), each URL on the list corresponding to a path to an available distributed processing container on the plurality of slave nodes;

issue the list of URLs to a load balancing node;

receive from the load balancing node an overall unique URL corresponding to the list of URLs;

use the overall unique URL to assign the user task service request to a plurality of available GPUs based on the resource availability and resource requirements of the user task service request, the assigning including using available distributed processing containers on the plurality of slave nodes; and retain the list of URLs corresponding to the distributed processing containers assigned to the user task service request.

12. The machine-useable storage medium of claim 11 wherein the distributed processing containers are implemented using a container-enabled system having a plurality of distributed containers for processing data.

13. The machine-useable storage medium of claim 11 wherein the instructions being configured forward the overall unique URL to a user node that originated the user task service request.

14. The machine-useable storage medium of claim 11 wherein assigning the user task service request is based on whether the user task service request is a GPU intensive task or a central processing unit (CPU) intensive task.

* * * * *